United States Patent [19]

Cooley

[11] Patent Number: 4,952,316

[45] Date of Patent: Aug. 28, 1990

[54] CONTINUOUS AERATION-BATCH CLARIFICATION WASTEWATER TREATMENT

[75] Inventor: Curtis D. Cooley, Rothschild, Wis.

[73] Assignee: Zimpro/Passavant Inc., Rothschild, Wis.

[21] Appl. No.: 412,073

[22] Filed: Sep. 25, 1989

[51] Int. Cl.$^5$ .............................. C02F 3/08; C02F 3/20
[52] U.S. Cl. .................................... 210/616; 210/626; 210/631
[58] Field of Search ........................ 210/616, 626, 631

[56] References Cited

U.S. PATENT DOCUMENTS

| | | | |
|---|---|---|---|
| 3,366,242 | 1/1968 | Nicol | 210/195.3 |
| 3,522,881 | 8/1970 | Nicol | 210/127 |
| 3,524,547 | 8/1970 | Nicol | 210/134 |
| 3,679,053 | 7/1973 | Koulovatos et al. | 210/220 X |
| 3,746,638 | 7/1973 | Gensman et al. | 210/608 |
| 3,904,518 | 9/1975 | Hutton et al. | 210/616 |
| 4,069,148 | 1/1978 | Hutton et al. | 210/616 |
| 4,623,464 | 11/1986 | Ying et al. | 210/626 X |
| 4,810,386 | 3/1989 | Coper et al. | 210/631 |
| 4,816,158 | 3/1989 | Shimurn et al. | 210/631 |

FOREIGN PATENT DOCUMENTS 1549400 8/1979 United Kingdom .

OTHER PUBLICATIONS

McShane et al., "Biophysical Treatment of Landfill Leachate Containing Organic Compounds" Proceedings of Industrial Waste Conference, 1986, (Pub. 1987) 41st, 167–197.

*Primary Examiner*—Peter Hruskoci
*Assistant Examiner*—Christopher Upton
*Attorney, Agent, or Firm*—Tipton L. Randall

[57] ABSTRACT

A single-stage continuous aeration-batch clarification process for purifying wastewater containing pollutants includes the steps of continuously aerating the wastewater in the presence of biologically active solids and powdered absorbent in an aeration zone. A portion of the mixture of wastewater, biologically active solids and powdered absorbent is transferred to a settling zone where a settled solids phase and a clarified liquid phase are formed. During the settling step additional wastewater flows into the aeration zone. The clarified liquid phase is discharged from the settling zone while the settled solids phase may be returned to the aeration zone or sent to disposal.

The process may be carried out with a single aeration basin and settling basin or with a plurality of aeration basins using a single settling basin.

18 Claims, 4 Drawing Sheets

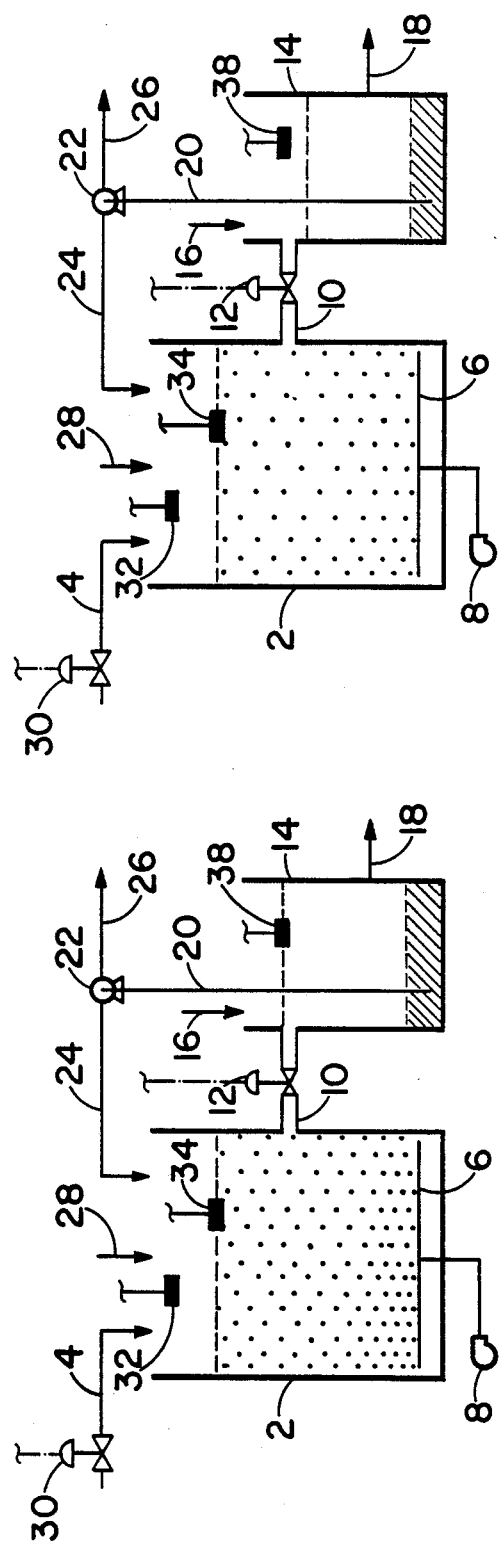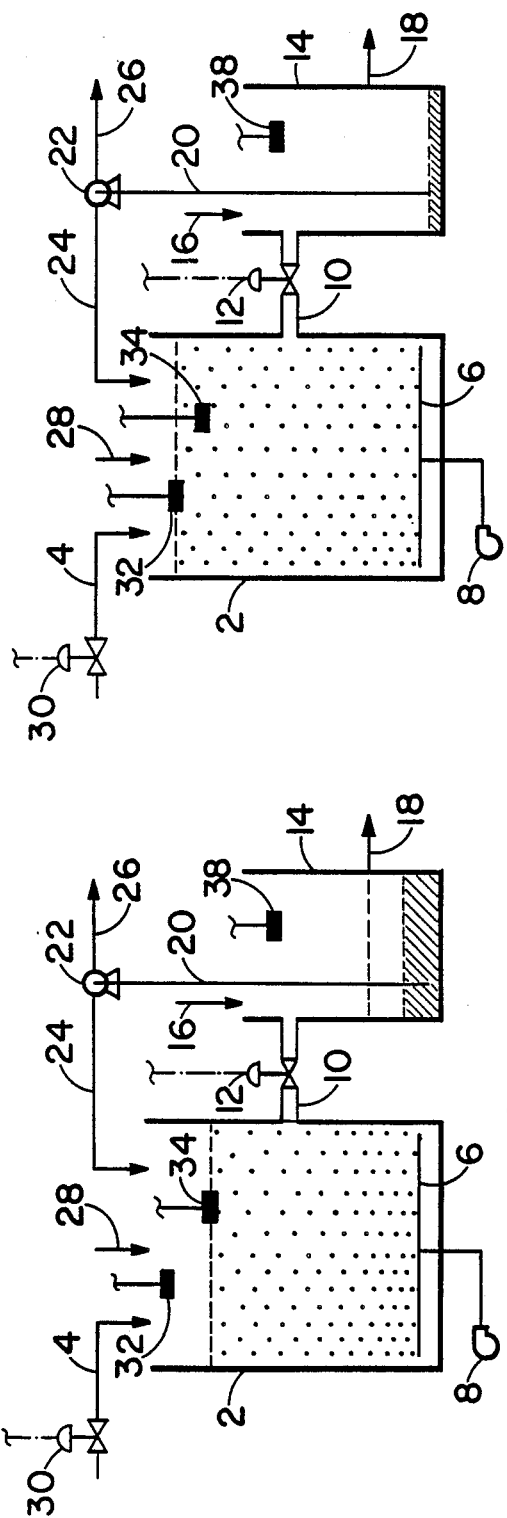

CONTINUOUS AERATION-BATCH CLARIFICATION WASTEWATER TREATMENT

BACKGROUND OF THE INVENTION

1. Field of the Invention

This invention relates to a continuous aeration biophysical step for treating wastewater followed by a batch clarification step to complete the treatment process.

2. Related Prior Art

The quantity of pollutants in wastewater is commonly determined by measuring the amount of dissolved oxygen required to biologically decompose the waste organic matter in the polluted water. This measurement, called biochemical oxygen demand (BOD), provides an index of the organic pollution of water. Some organic contaminants, such as chlorinated aromatic compounds, are not amenable to conventional biological decomposition and tests such as chemical oxygen demand (COD) and total organic carbon (TOC) have been employed to measure the concentration of these compounds.

Various aerobic wastewater treatment processes are in use which are classified either as continuous flow or batch flow in their mode of operation. Each process has advantages as well as shortcomings with respect to performance, stability and adaptability to changing wastewater characteristics.

The sequencing batch reactor (SBR) or batch mode of wastewater treatment is advanced as a simple, single tank process comprising a timed sequence of equalization, aeration and liquid/solids separation as opposed to continuous flow processes which employ a space sequence of the above functions. The batch mode offers greater flexibility of operation and control in that it is easier to adjust a time period than to change a space to redistribute process functions.

One of the advantages of the SBR process is that settling takes place under quiescent conditions in a basin under near ideal settling conditions. This also assures that the microorganisms remain in the system since the mixed liquor solids are not returned from a separate sedimentation basin. However, fluctuations in wastewater characteristics or other process upsets can result in poor settling of mixed liquor solids from treated wastewater, culminating in passage of solids from the system with the effluent and a loss of process performance. Alternatively, decanting a reduced volume of effluent per cycle decreases the volumetric throughput of the SBR system.

Nicol, U.S. Pat. No. 3,366,242 disclose a continuous flow system for biological treatment of wastewater containing a first aeration/predigestion chamber fitted with an air lift pump to transfer waste to a settling chamber for solids removal and effluent discharge. Settled sludge is recycled to the first chamber.

Nicol also discloses treatment systems using two aeration chambers in series. In U.S. Pat. No. 3,522,881 the second aeration chamber functions alternately as an aeration chamber and a settling chamber with effluent removed therefrom. In U.S. Pat. No. 3,524,547 influent wastewater flow alternates between the first and second aeration chambers and the chamber not receiving feed receives flow from the other chamber and operates as a settling chamber without aeration.

Koulovatos et al., U.S. Pat. No. 3,679,053 discloses two aeration tanks operated in series with the second tank acting as a settling basin without aeration for a portion of time. The effluent from the second aeration/settling tank flows to another settling tank for further clarification. Solids from the second settling tank are returned to the first aeration basin. Similar flow schemes are described by Gensman et al., U.S. Pat. No. 3,746,638 and in GB No. 1,549,400 where solids from both settling tanks are recycled to the first aeration tank.

A particularly useful process for removing pollutants from wastewater employs a mixture of bacteria and powdered activated carbon in a treatment zone. This process, called the PACT ® treatment system, is disclosed in Hutton et al., U.S. Pat. Nos. 3,904,518 and 4,069,148. The PACT treatment system operates as a continuous flow process with an aeration basin followed by a separate clarifier to separate biologically active solids and carbon from the treated wastewater, with the settled sludge returned to the aeration basin.

A slightly different biophysical treatment process is described by McShane et al. in "Biophysical Treatment of Landfill Leachate Containing Organic Compounds", *Proceedings of Industrial Waste Conference*, 1986 (Pub. 1987), 41st, 167-77. In this process a biological batch reactor is used with powdered activated carbon and the system is operated in the "fill and draw" or SBR mode. A similar scheme for treatment of leachate is disclosed in Ying et al., U.S. Pat. No. 4,623,464 in which an SBR is operated with both biologically active solids and carbon present to treat PCB and dioxin-containing leachate.

SUMMARY OF THE INVENTION

The instant invention, through a modification of the SBR mode of operation, can provide efficient liquid/solids separation of difficult to settle mixed liquors, over a wide range of hydraulic detention times. Further, this modification can provide the same volumetric throughput as an SBR system, with longer settling times, all at a minimal capital expense. Also, adding a small settling tank to an existing SBR system and modification of the SBR mode of operation can increase the volume of wastewater treated by the SBR system in a specific period of time.

In another embodiment of the invention, provision is made to handle continuous influent flow alternated between two aeration tanks, each tank serviced by the same settling tank providing the required settling time to produce a suitable liquid/solids separation and clarified effluent from the system.

An object of the invention is to provide a process for wastewater treatment with improved solids capture in the batch settling of such particles, compared to a continuous flow settling system.

A further object of the invention is to provide a process where no short circuiting of raw wastewater is possible as may occur with continuous flow systems.

A further object of the invention is to provide a wastewater treatment process capable of operating over a wide range of hydraulic detention time (HDT). Sufficient settling time for separation of biological organisms and powdered adsorbent from treated wastewater is provided at both very short (0.5-1 hr) and very long (24 hr) HDT with settling time nearly equalling the duration of the period of aeration at these extremes.

Another object of the invention is to provide a system capable of handling either an intermittent or a continuous influent of wastewater.

The invention provides a single-stage wastewater treatment process in which wastewater is treated in an aeration zone wherein the wastewater is continuously aerated with an oxygen-containing gas in the presence of a sufficient amount of biologically active solids and powdered adsorbent for a period of time sufficient to remove the pollutants. The mixture of wastewater, biologically active solids and powdered adsorbent, termed mixed liquor, flows to a settling zone where it is retained for a sufficient time for separation of mixed liquor to a settled solids phase and a clarified liquid phase to occur. A flocculent aid can be added to the mixed liquor as it enters the settling zone for promoting settling of solids.

During the settling step in the settling zone, additional wastewater flows into the aeration zone contacting the aerating biologically active solids and powdered adsorbent therein. After the settling step, the clarified liquid phase is removed from the settling zone for further treatment or release to the environment. The settled solids phase may be returned to the aeration zone to contact additional incoming wastewater. If sufficient biological solids are produced within the aeration zone, a portion or all the biological solids and powdered adsorbent in the settling zone may be sent to disposal to control solids in the treatment system. Fresh adsorbent is added to make up for that adsorbent sent to disposal for solids control.

In one embodiment, a single aeration basin receives feed wastewater on an intermittent basis, such as from a holding or equalization tank, and after a specified aeration period, a portion of the aeration basin contents is transferred to a settling basin for liquid/solids separation.

In another embodiment, a plurality of aeration basins receive feed wastewater in turn, thus accommodating a continuous influent flow. A settling basin receives mixed liquor from one aeration basin for liquid/solids separation, settles the solids and discharges the clarified liquid, then returns the solids phase to the aeration basin from which they came. Alternatively, the solids are sent to disposal. The filling of each aeration basin and transfer of mixed liquor to the settling basin are staggered in time such that the steps of settling, liquid discharge and solids recycle in the settling basin are completed for a first aeration basin before the transfer of mixed liquor to the settling basin from a second aeration basin commences.

The powdered adsorbent, such as powdered activated carbon, added to the aeration zone assists in settling of the mixed liquor solids within the batch settling zone, as well as providing a surface for suspended growth of biological organisms. The powdered adsorbent provides additional stability to the treatment system at times of shock loads of toxic compounds by adsorbing the compounds, thus protecting the biological organisms.

Other aspects, advantages and objectives of the invention will become apparent to those skilled in the art upon reviewing the following detailed description, the drawings and the appended claims.

BRIEF DESCRIPTION OF THE DRAWINGS

FIGS. 2a-2h are diagrams showing the sequence of steps which make up the process of the invention.

DESCRIPTION OF THE PREFERRED EMBODIMENTS

As described above, this invention is a method for treating wastewater, capable of operating over a wide range of hydraulic detention time (HDT), but with sufficient settling time to allow for separation of biological solids and powdered adsorbent from treated wastewater at even very short HDT. The HDT is the volume of an aeration basin divided by the volumetric flow of wastewater to the basin per unit time.

Figure 1:
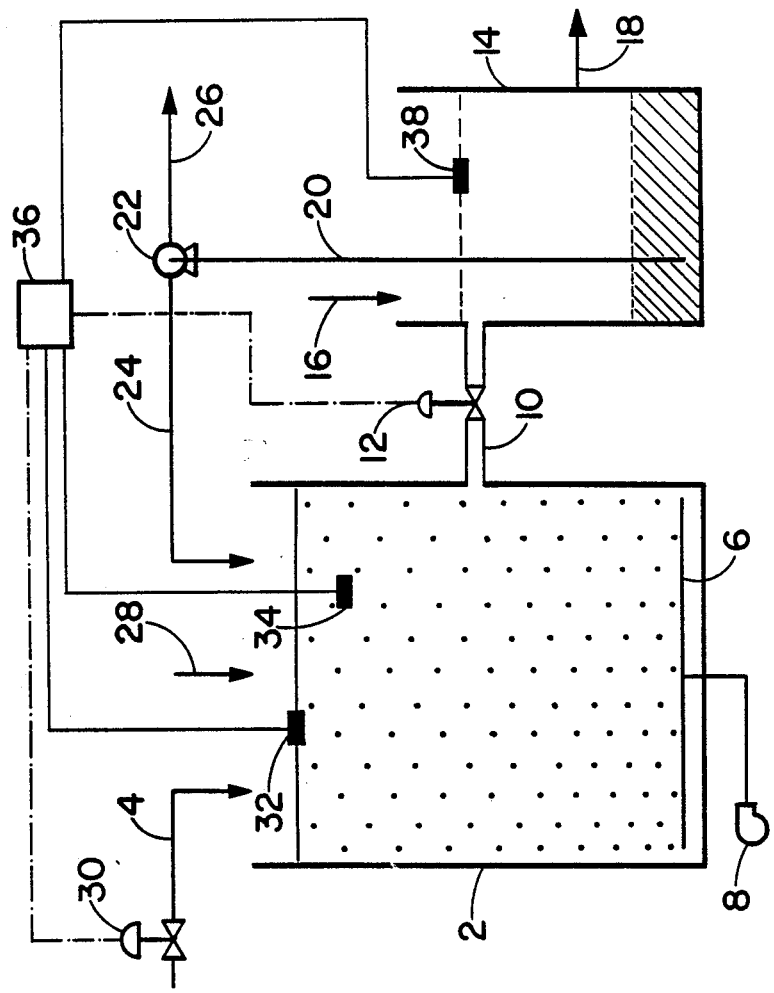
FIG. 1 is a diagram showing the components used to carry out the process of the invention.

The drawing of FIG. 1 illustrates the basic equipment necessary to carry out the treatment process of the invention. Wastewater enters an aeration zone or aeration basin 2 via a conduit 4. The aeration basin 2 contains an aeration means such as a sparge 6 which continuously aerates the contents of the basin 2 with an oxygen containing gas provided by a blower 8. The aeration basin contains a mixture of biologically active solids, powdered adsorbent and wastewater, termed a mixed liquor. The adsorbent must be finely divided and readily dispersible in an aqueous medium. Various adsorbents useful in purifying wastewater can be used. Suitable adsorbents include powdered activated carbon, fuller's earth, diatomaceous earth, fly ash, coke breeze, etc. The preferred adsorbent is powdered activated carbon such as Hydrodarco H, available from American Norit Co., Jacksonville, Fla. A conduit 10, with a control valve 12, provides a means to transfer a portion of the contents of the aeration basin 2 to a settling zone or clarifier basin 14. The volume of the clarifier basin 14 is roughly 25–65% of the capacity of the aeration basin. Optionally, a flocculent aid may be added to the clarifier basin 14 via a conduit 16 to assist in settling of solids. Within the clarifier basin the mixed liquor settles to produce a clarified liquid phase and a settled solids phase. The clarified liquid phase discharges from the clarifier 14 via a conduit 18, and the solids phase returns to the aeration basin through a conduit 20, a pump 22 and a solids recycle conduit 24. Solids control for the treatment system is achieved by diverting solids from the pump 22 via a conduit 26 to disposal. Addition of powdered adsorbent to the aeration zone or aeration basin of the treatment process via a conduit 28 provides a means of making up for adsorbent diverted to disposal for solids control. A valve 30 in inlet conduit 4 controls wastewater flow to the aeration basin 2. Two liquid level switches, 32 and 34, are positioned in the aeration basin 2 and connected to a controller 36 which operates inlet valve 30. Another liquid level switch 38 is positioned in the settling basin 14 and connected to the controller 36 which also operates the control valve 12 between the aeration basin 2 and the settling basin 14.

Figure 2A:
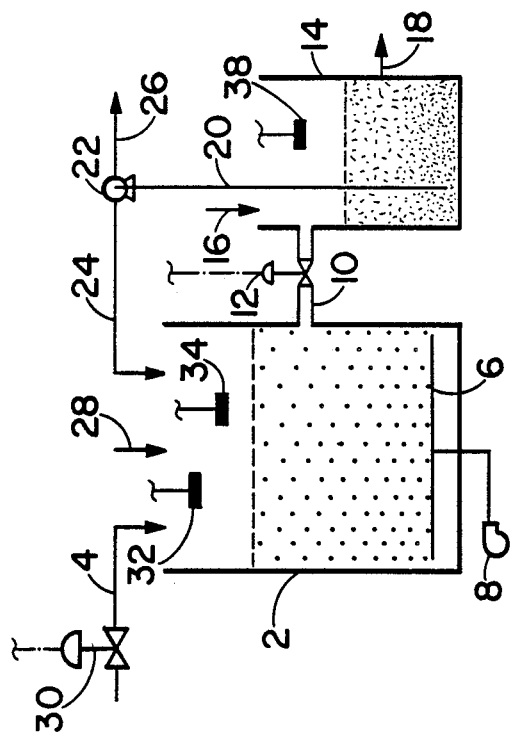
Figure 2B:
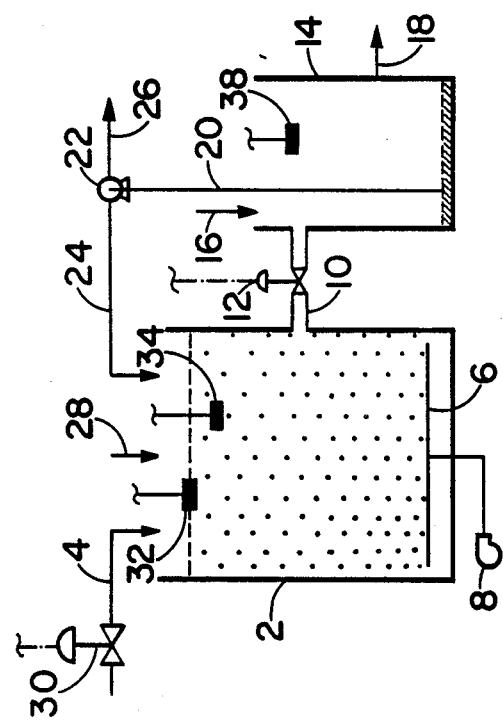
Figure 2C:
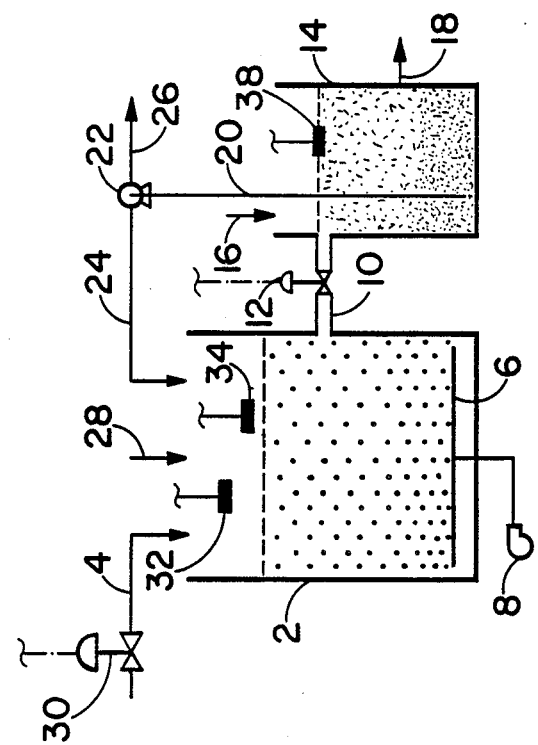

Referring now to FIGS. 2a-2h, wherein the sequence of steps in the process is illustrated. Only portions of the liquid level switch and control system are shown in FIGS. 2a-2h for reasons of clarity. The aeration basin 2 contains a mixture of wastewater, biological solids and powdered adsorbent, termed a mixed liquor, which is continuously aerated by the sparge 6 with an oxygen containing gas, such as air, provided by a blower 8. Wastewater to be treated enters the basin 2 via a conduit 4 until the liquid level therein reaches a preselected first level, as shown in FIG. 2a. Wastewater flow is controlled by a valve 30, operated by a controller 36, which closes when the liquid level activates a liquid level switch 32 located at said preselected first level. The concentration of biological solids in the mixed liquor is between about 100 and 10,000 mg/l, and the concentration of powdered adsorbent therein is between about 100 and 30,000 mg/l. In this embodiment, the intermittent flow of wastewater may come from a holding tank or the like. The incoming wastewater optionally may have received a solids settling step of primary treatment before entering aeration basin 2 such as might occur in a holding tank. Aeration continues for a predetermined period of time where the biological organisms and powdered adsorbent function together to remove pollutants from the wastewater. The readily metabolized pollutants are quickly removed by the biological organisms while the less easily degraded pollutants are adsorbed by the adsorbent and retained within the system, allowing the biological organisms a longer time to degrade these components. The powdered adsorbent, in adsorbing the less easily degraded pollutants, protects the biological organisms from toxic concentrations of these substances.

The hydraulic detention time (HDT) of the wastewater within the aeration basin may be as short as 0.5 to 1 hour or as long as 24 hours depending on the characteristics of the wastewater and the degree of treatment required. This treatment results in removal of BOD, COD and TOC from the wastewater. Next a preselected quantity of the mixed liquor is transferred from the aeration basin 2 to the settling basin 14 via a conduit 10 with a control a valve 12. The quantity transferred may be 25 to 65% of the total volume of mixed liquor in the aeration basin 2. The quantity of mixed liquor transferred is controlled by a level control switch 38 located in basin 14 which, through the controller 36, closes the valve 12 upon the liquid level activating said switch. A flocculent aid may be added via a conduit 16 at this point to the mixed liquor flowing into the settling basin 14. The flocculent aid alternatively may be added to the conduit 10 ahead of the valve 12 to provide thorough mixing with the mixed liquor flowing into basin 14. While various suitable flocculent aids can be used, cationic polymers, such as Percol 787 or Percol 788 marketed by Allied Colloids, Inc., Suffolk, Va., are preferred. The dose of cationic polymer is generally between 1 and 10 mg/l of mixed liquor transferred to the settling basin 14. During the transfer, FIGS. 2b and 2c, aeration continues within the aeration basin 2.

Figure 2D:
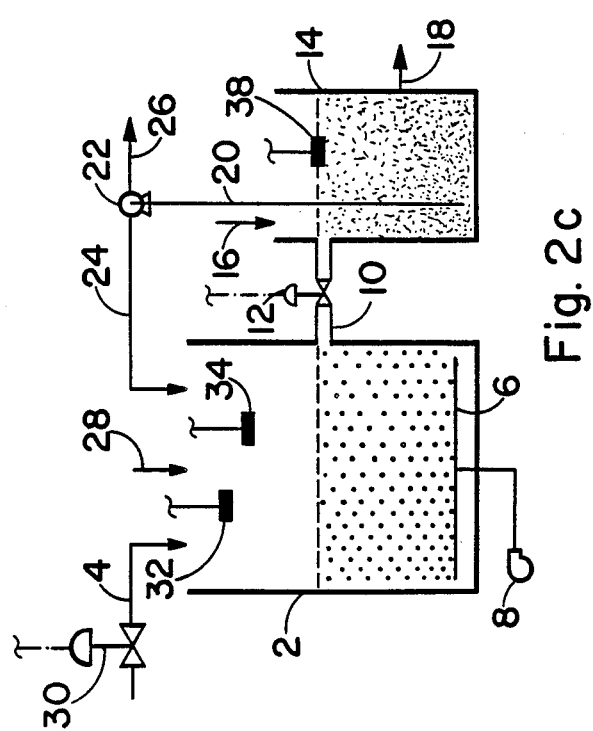

As shown in FIG. 2d, as the control valve 12 closes and the mixed liquor within the settling basin 14 begins to settle, valve 30 opens and additional wastewater from the conduit 4 flows into the aeration basin 2 with powdered adsorbent optionally added from the conduit 28. In FIG. 2e, the wastewater flow to the aeration basin 2 ceases when the liquid level reaches a second preselected level, lower than said first preselected level, leaving capacity for solids returned from the settling basin 14. Again wastewater flow into the aeration basin 2 is controlled by the valve 30 connected through the controller 36 to a second liquid level switch 34 located at said preselected second level. Aeration within the basin 2 is continuous. The mixed liquor within the clarifier 14 has now settled to a clarified upper liquid phase and a settled solids phase. The powdered adsorbent assists in settling of the mixed liquor solids while the flocculent aid further assists in this solids settling step. The settling time may be as short as 0.5 to 1 hour or as long as 24 hours. All or a portion of the clarified liquid phase discharges from the settling basin 14 via a conduit 18 to further treatment or to the environment as shown in FIGS. 2f and 2g. Next, all or a portion of the settled solids phase returns to the aeration basin 2 by means of a conduit 20, a pump 22 and a solids recycle conduit 24. This volume of returned solids phase raises the liquid level in the aeration basin 2 to said first preselected level, as shown in FIG. 2h. These steps are then repeated to treat additional volumes of wastewater.

The duration of settling in basin 14 is roughly equal to the aeration period in the aeration basin minus the time required to transfer mixed liquor to the settling basin 14, discharge clarified liquid and return settled solids to the aeration basin. For example, transferring 50 percent of the mixed liquor to the settling basin each cycle and allowing 2 hours for settling while the aeration basin fills and aerates, results in an HDT for the aeration basin of approximately 4 hours with a settling time of approximately 2 hours.

In order to control solids within the treatment system, a portion or all of the settled solids phase from the settler clarifier 14 may be diverted to disposal via a conduit 26 connected to the pump 22. Should all of the solids from the settling basin 14 be diverted to disposal, the incoming wastewater may fill the aeration basin 14 to said first preselected liquid level since no recycle of solids occurs to add volume to the basin 14. Additional amounts of powdered adsorbent are added to maintain the desired concentration of adsorbent in the aeration basin 14. These options may be easily implemented with programmable level controllers, well known in the art. Further, no short circuiting of feed wastewater to the settler can occur since influent flow to the aeration basin 2 ceases for a period of time before a portion of the mixed liquor is transferred to the settling basin 14.

In the treatment of wastewater by this process, selected amounts of powdered adsorbent, such as powdered activated carbon, are added to the aeration basin 2 by a conduit 28. The powdered adsorbent provides an improved settling of solids in the clarification basin 14 as well as additional stability to the treatment process, protecting the biological organisms in the mixed liquor from shock loads of toxic substances. The dose of powdered adsorbent to influent wastewater may vary from 10 to 20 mg/l to several thousand mg/l, while the concentration of powdered adsorbent in the mixed liquor may range from 100 to 30,000 mg/l, as mentioned earlier. When the treatment system is in stable operation, a portion of the solids from settling basin 14 is removed each operating cycle and fresh adsorbent, equivalent to that removed with the solids, is added to the aeration basin with incoming wastewater, maintaining the desired concentration of powdered adsorbent therein.

Figure 3:
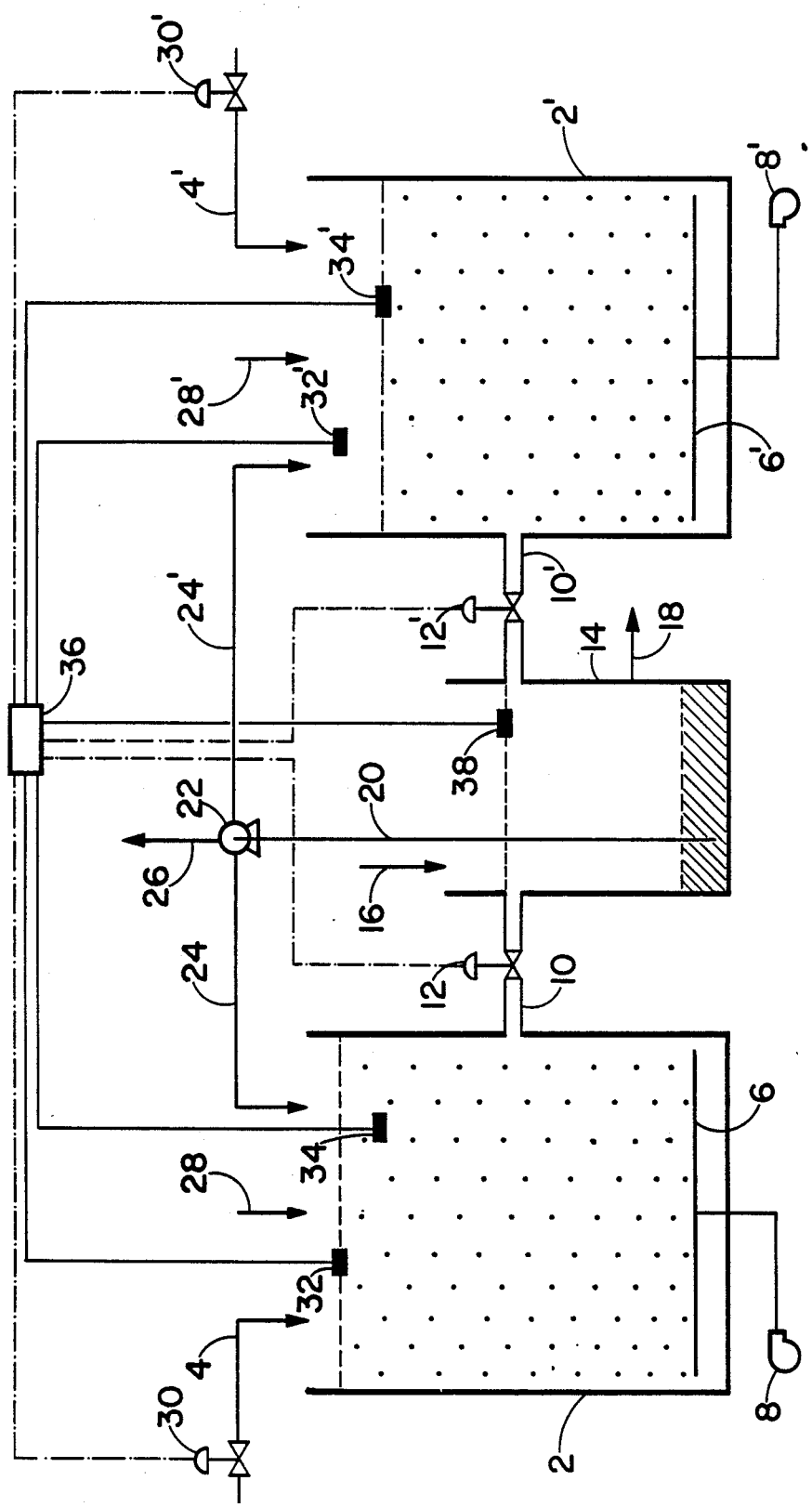
FIG. 3 is a diagram showing an alternative embodiment of the process of the invention.

FIG. 3 shows a variation of the invention with the capability of handling a continuous flow of wastewater. Those components common to FIGS. 1,2 and 3 are shown with the same corresponding numbers.

In this embodiment two separate aeration basins 2,2' receive wastewater via the conduits 4,4' respectively. Each aeration basin has a sparge 6,6' and blower 8,8' to aerate the mixed liquor within. Each basin has means, conduits 10,10' and control valves 12,12', to transfer preselected quantities of mixed liquor to a single settling basin 14 for liquid/solids separation. The quantity transferred may be 25 to 65% of the volume of mixed liquor within one of said aeration basins. Again, a flocculent aid may be added via a conduit 16 to said basin 14 to assist in solids settling. Cationic polymers such as Percol 787 or Percol 788 again are preferred. Clarified liquid flows from the clarifier 14 via effluent conduit 18 while settled solids returns to the aeration basins by a conduit 20, a pump 22 and solids recycle conduits 24,24'. Solids control is achieved by diverting a portion of the solids phase to disposal from the pump 22 via a conduit 26. Likewise, a powdered adsorbent is added to the aeration basins 2,2' from conduits 28,28' respectively, as described above to protect the treatment process and assist in settling of solids. Each aeration basin has liquid level switches 32,32' and 34,34' connected to a controller 36 for sensing first and second selected liquid levels in each basin 2,2'. Control of influent wastewater flow is by valves 30,30' operated by controller 36. The selected liquid level within the settling basin 14 is maintained by a level switch 38 connected to the controller 36 which also operates inlet valves 12,12' which deliver mixed liquor to the settling basin 14.

In this embodiment the cyclic operation of each aeration basin 2,2' and the commonly used settling basin 14 is staggered in time such that the settling cycle, (FIGS. 2b–2h), performed within the settling basin 14, is completed for a first aeration basin and then for a second aeration basin. The timing of the cycles is adjusted such that wastewater flows to the first basin and, when the preselected second liquid level is reached, FIG. 2e, the wastewater then flows to the second aeration basin until the preselected second liquid level is reached therein. The wastewater then again flows to the first aeration basin. The control of influent wastewater flow is by means of liquid level switches and valves as described for the single aeration basin.

Although the aeration basins 2,2' and the settling basin 14 are shown as separate containers, these basins may share common walls or may even be formed by partitioning a larger basin into separate sections in order to practice the process of the invention.

I claim:

1. A process for biophysical treatment of wastewater to reduce BOD, COD and TOC therein comprising the steps:
   (a) introducing a wastewater into an aeration zone to a first preselected level therein;
   (b) continuously aerating the wastewater in said aeration zone with an oxygen containing gas in the presence of a sufficient concentration of biologically active solids and powdered adsorbent to reduce the BOD, COD and TOC of the wastewater to desired levels and form a biophysical mixed liquor;
   (c) transferring a predetermined quantity of said mixed liquor from said aeration zone to a settling zone;
   (d) settling said mixed liquor within said settling zone for a time sufficient to produce a clarified, substantially solids-free, liquid phase and a settled solids phase, while simultaneously adding wastewater to said mixed liquor aerating within said aeration zone to a second preselected level, lower than said first level, therein; and
   (e) transferring all or a portion of said clarified liquid phase from said settling zone to further treatment or to the environment; and
   (f) transferring all or a portion of said settled solids phase from said settling zone to said aeration zone wherein said settled solids phase transferred to said aeration zone raises the mixed liquor level from said second selected level to said first selected level therein.

2. A process according to claim 1 wherein solids control for the treatment process is maintained by transferring a portion of said settled solids phase from said settling zone to disposal.

3. A process according to claim 2 wherein fresh powdered adsorbent is added to said aeration zone to compensate for powdered adsorbent sent to disposal and maintain the desired concentration of powdered adsorbent therein.

4. A process according to claim 3 wherein said powdered adsorbent is added at a rate of 10 mg to 2,000 mg per liter of influent wastewater.

5. A process according to claim 4 wherein said adsorbent is powdered activated carbon.

6. A process according to claim 1 further comprising addition of a flocculent aid to said mixed liquor entering said settling zone to assist in settling said solids phase therein.

7. A process according to claim 6 wherein said flocculent aid is a cationic polymer.

8. A process according to claim 7 wherein said cationic polymer is added to said mixed liquor at a dose of 1 to 10 mg/l.

9. A process according to claim 1 wherein the powdered adsorbent concentration in said mixed liquor is between about 100 and 30,000 mg/l.

10. A process according to claim 1 wherein said concentration of biologically active solids within said aeration zone is between about 100 and 10,000 mg/l.

11. A process according to claim 1 wherein the wastewater is retained within said aeration zone for a hydraulic detention time of between 1.0 and 24 hours and said mixed liquor is retained within said settling zone for a settling time between 0.5 and 24 hours.

12. A process according to claim 1 wherein said aeration zone comprises a single basin wherein continuous aeration of wastewater, biologically active solids and powdered adsorbent occurs and
   in step (a) said introduction of wastewater occurs intermittently.

13. A process according to claim 12 wherein said predetermined quantity of mixed liquor transferred from said aeration zone to said settling zone is 25 to 65% of the total volume of mixed liquor.

14. A process according to claim 1 wherein said aeration zone comprises a plurality of aeration basins;
   in step (a) said wastewater is introduced into one of said basins to a first preselected level therein, and then into a different one of said basins to a first preselected level therein and this sequence is continued; and steps (c) through (f) are completed in a settling zone for one of said aeration basins before steps (c) through (f) commence in said settling zone for a different one of said aeration basins.

15. A process according to claim 14 wherein said predetermined quantity of mixed liquor transferred from said aeration zone to said settling zone is 25 to 65% of the total volume of mixed liquor in one of said aeration basins.

16. A process for biophysical treatment of wastewater to reduce BOD, COD and TOC therein comprising the steps:
   (a) introducing a wastewater into an aeration zone to a first preselected level therein;
   (b) continuously aerating the wastewater in said aeration zone with an oxygen containing gas in the presence of a sufficient concentration of biologically active solids and powdered activated carbon to reduce the BOD, COD and TOC of the wastewater to desired levels and form a biophysical mixed liquor;

(c) transferring a predetermined quantity of said mixed liquor from said aeration zone to a settling zone;

(d) settling said mixed liquor within said settling zone for a time sufficient to produce a clarified, substantially solids-free, liquid phase and a settled solids phase, while simultaneously adding wastewater to said mixed liquor aerating within said aeration zone to a second preselected level, lower than said first level, therein;

(e) transferring all or a portion of said clarified liquid phase from said settling zone to further treatment or to the environment; and (f) transferring all or a portion of said settled solids phase from said settling zone to said aeration zone wherein said settled solids phase transferred to said aeration zone raises the mixed liquor level from said second selected level to said first selected level therein.

17. A process according to claim 16 wherein solids control for the treatment process is maintained by transferring a portion of said settled solids phase from said settling zone to disposal.

18. A process according to claim 17 wherein fresh powdered activated carbon is added to said aeration zone to compensate for powdered activated carbon sent to disposal and maintain the desired concentration of powdered activated carbon therein.

* * * * *